(No Model.)

J. J. GRAF.
WASH STAND.

No. 361,585. Patented Apr. 19, 1887.

WITNESSES:
C. D. Zerbe
Dug. McKillop

INVENTOR:
John J. Graf,
By
Attorney.

United States Patent Office.

JOHN J. GRAF, OF CINCINNATI, OHIO.

WASH-STAND.

SPECIFICATION forming part of Letters Patent No. 361,585, dated April 19, 1887.

Application filed August 28, 1886. Serial No. 212,095. (No model.)

*To all whom it may concern:*

Be it known that I, JOHN J. GRAF, of Cincinnati, in the county of Hamilton and State of Ohio, have invented a new and useful Improvement in Wash-Stands, which improvement is fully set forth in the following specification and accompanying drawings, in which—

Figure 1:
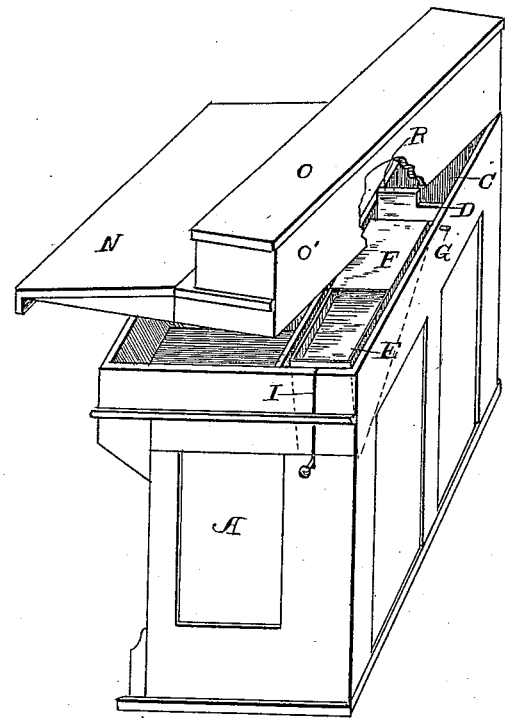
Figure 2:
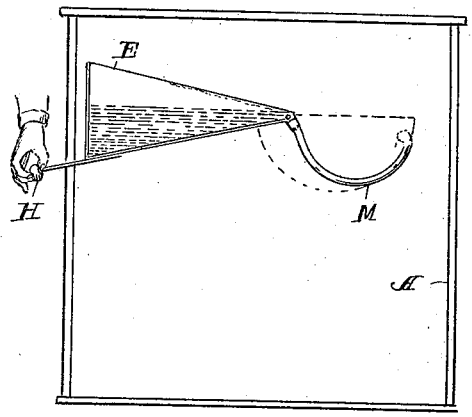
Figure 3:
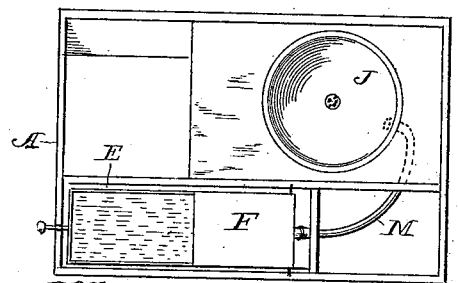
Figures 4, 5:
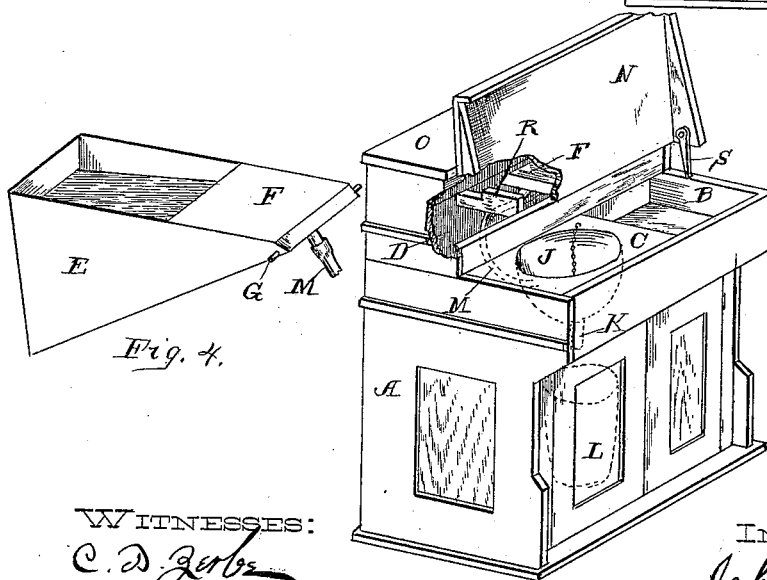

Figure 1 is a perspective view, partly in section, showing a rear and end view of my improvement in wash-stands. Fig. 2 is a rear view of the same, partly in section. Fig. 3 is a top view showing the location of a portion of the reservoir and bowl; Fig. 4, a perspective view of the reservoir; and Fig. 5, a front perspective view, partly in section.

The object of my invention is to provide a cheap and handy wash-stand so arranged that both the reservoir for holding the water and the bowl for washing purposes will be hidden when not in use, the whole having the appearance of either an ordinary stand or writing-desk, for which latter purpose it is well adapted.

The main body A of the stand is made of any suitable height or length, having, preferably, one or more doors in the front thereof, and closets within provided with shelving or otherwise, as desired. The upper portion of the main stand is divided into three compartments, one compartment, B, being designed for the towel-receptacle; the second compartment, C, to receive the wash-bowl, and the third compartment, D, to contain the water-reservoir. The compartment D is preferably located at the rear side, as shown in Fig. 3, and the receptacle is preferably made as shown in Fig. 4, the sides E of the said receptacle being in shape of a right-angled triangle, having a closed top, F, over a portion of the upper side. The narrow or inner end of this receptacle has pivotal lugs G on the sides, which rest in suitable notches in the sides of the compartment, and the opposite or outer end of the receptacle has an arm, H, which projects out through a slot, I, in the end of the stand-frame. The bowl J rests in the compartment C, its upper surface being preferably flush with the upper edge of the main body of the stand, and this bowl is provided with a discharge-spout, K, below, through which the water may be withdrawn and deposited in the bucket L in the compartment or closet below.

A flexible pipe or hose, M, having one end connected with the inner pivoted end of the reservoir has its opposite end connected with the side of the wash-bowl at a point lower than the supply end of the reservoir.

As will be observed, in Fig. 1 the reservoir is in its normal position, the upper edge of the reservoir being flush with the top of the stand, and the water contained in the reservoir does not, therefore, flow out through the pipe M.

In Fig. 2 the free end of the reservoir is raised, so as to permit the water to pass out through the pipe M. It is obvious that the pipe M may be located at the side of the reservoir near the pivot, if desired, instead of at the end, as shown in the drawings; but that will be no departure from my invention.

The upper part or top of the wash-stand is made in imitation of a desk. The desk or front part, N, of the said top is preferably sloping or inclined, and the rear part, O, raised or provided with an elevated portion, so as to provide space for drawers or boxes and also to add to the appearance of the stand, as well as to permit space for the reservoir to rest in when raised up so as to discharge the water. The sloping portion of the desk N is hinged to the rear upright portion, O, and the rear part, O, is pivoted to the stand A at one corner, as shown at P, Fig. 1.

The partition between the compartments C and D has its inner portion, R, elevated above the surrounding partitions, so as to provide a stop, against which the rear part, O', of the elevated portion rests when the free end of the top is drawn forward.

The operation is as follows: When it is desired to supply the reservoir with water, the top portion is drawn forward, as shown in Fig. 1, and water poured into the open space of the reservoir, after which the top is again moved back, as shown in Fig. 5, and the lid N elevated. This lid N is held in position by means of a stop, S. By seizing the handle H and raising the free end of the reservoir the water discharges through the pipe M into the bowl J, and after drawing the water from the bowl the lid N is again turned, so as to hide the interior. The towel-receptacle is convenient, and, being located as here shown, is always exposed when the stand is in position for use. By this arrangement the entire washing apparatus, including the water-receptacle, bowl, towel-receptacle, and soap-cup, are hidden from view, and the whole makes a neat appearance in a room.

Having described my invention, what I claim as new is—

In combination with the wash-stand body A, having bowl J, the tilting reservoir E, triangular in shape, covered at F, and provided with pivotal lugs G and arm H, and the flexible pipe M, connecting the bowl and reservoir, all substantially as described.

In testimony that I claim the foregoing I have hereunto set my hand, this 10th day of May, 1886, in the presence of witnesses.

JOHN J. GRAF.

Witnesses:
 J. H. BAILEY,
 J. S. ZERBE.